US012245981B1

(12) United States Patent
Cun

(10) Patent No.: US 12,245,981 B1
(45) Date of Patent: Mar. 11, 2025

(54) PHALLUS-LIKE EROTIC DEVICE CAPABLE OF EJECTING LIQUID

(71) Applicant: Shenzhen Envision Technology Innovation Co, Ltd., Shenzhen (CN)

(72) Inventor: Lang Cun, Shenzhen (CN)

(73) Assignee: Shenzhen Envision Technology Innovation Co, Shenzhen (CN)

( * ) Notice: Subject to any disclaimer, the term of this patent is extended or adjusted under 35 U.S.C. 154(b) by 0 days.

(21) Appl. No.: 18/782,072

(22) Filed: Jul. 24, 2024

(51) Int. Cl.
*A61H 19/00* (2006.01)

(52) U.S. Cl.
CPC ....... *A61H 19/44* (2013.01); *A61H 2201/105* (2013.01); *A61H 2201/1246* (2013.01); *A61H 2201/503* (2013.01); *A61H 2201/5051* (2013.01); *A61H 2205/087* (2013.01)

(58) Field of Classification Search
CPC ........ A61H 19/00; A61H 19/40; A61H 19/44; A61H 19/50
See application file for complete search history.

(56) References Cited

U.S. PATENT DOCUMENTS

2004/0034315 A1* 2/2004 Chen ...................... A61H 19/44 601/72
2022/0249943 A1* 8/2022 Poole ........................ A63F 9/00

FOREIGN PATENT DOCUMENTS

EP 2735299 * 5/2014 ............ A61H 19/00
EP 2735299 A1 * 5/2014 ............ A61H 19/44

* cited by examiner

*Primary Examiner* — Carrie R Dorna
(74) *Attorney, Agent, or Firm* — Justin Lampel

(57) ABSTRACT

The present disclosure provides a phallus-like erotic device capable of ejecting a liquid. A body is disposed in a soft sleeve, and an opening is formed at an insertion end of the body. A liquid storage assembly is formed with an inner cavity, and includes a water tube and an air pump. The air pump is connected to the inner cavity. One end of the water tube is disposed on the air pump, and the other end of the water tube is connected to the opening. A control assembly is disposed in the soft sleeve, and configured to control liquid to be ejected through the opening. Due to the liquid storage assembly and the opening at the insertion end of the phallus-like erotic device capable of ejecting a liquid, the control assembly controls the liquid to be ejected, which can simulate real experience of liquid ejecting.

10 Claims, 6 Drawing Sheets

PHALLUS-LIKE EROTIC DEVICE CAPABLE OF EJECTING LIQUID

TECHNICAL FIELD

The present disclosure relates to the field of sex toys, and in particular to a phallus-like erotic device capable of ejecting a liquid.

BACKGROUND

Conventional sex toy markets include products in various forms and functions. Sex toys are used to provide sexual pleasure and stimulation for individuals or partners. The sex toys include vibrating massage sticks, simulation phalli, and the like, and simulate sexual behavior and enhance sexual experience via functions such as the vibration technology, the simulation material, and remote control.

The conventional technology usually includes a built-in motor and a vibration mechanism, and provides a sense of stimulation via different vibration modes and intensity. Alternatively, materials such as advanced silicone and TPE are used to simulate touch and appearance of human skin, to enhance a sense of reality of use experience.

However, conventional sex toys still have some limitations in providing realistic experience. Sex toys relying on vibration and simulation materials may not completely simulate physiological responses in real behavior, and still lack a sufficient sense of reality in simulating the sexual behavior. It is difficult to achieve physiological simulation effect desired by users.

SUMMARY

In view of this, it is necessary to provide a phallus-like erotic device capable of ejecting a liquid to resolve the above problems.

Embodiments of the present disclosure provide a phallus-like erotic device capable of ejecting a liquid. The phallus-like erotic device capable of ejecting a liquid includes:

- a soft sleeve;
- a body, disposed in the soft sleeve, where an opening is formed at an insertion end of the body;
- a liquid storage assembly, formed with an inner cavity, where the liquid storage assembly further includes a water tube and an air pump, the air pump is disposed in the soft sleeve and connected to the inner cavity, and one end of the water tube is disposed on the air pump, and the other end of the water tube is connected to the opening;
- the liquid storage assembly is further formed with a liquid inlet connected to the inner cavity, and the liquid inlet is capable of being opened or closed, to inject liquid into the inner cavity; and
- a control assembly, disposed in the soft sleeve, electrically connected to the air pump, and configured to control the liquid to be ejected through the opening.

In at least one embodiment of the present disclosure, the air pump is provided with a liquid ejecting port, and the liquid channel is a water tube that includes a first connection tube and a second connection tube; and

- one end of the first connection tube is connected to the liquid ejecting port, the other end of the first connection tube is connected to the opening, one end of the second connection tube is connected to the air pump, and the other end of the second connection tube is connected to the inner cavity.

In at least one embodiment of the present disclosure, the liquid storage assembly comprises a liquid delivery port connected to the inner cavity, the one end of the second connection tube is connected to the air pump, and the other end of the second connection tube is connected to the liquid delivery port.

In at least one embodiment of the present disclosure, the air pump further includes a liquid ejecting end and a drive end that is electrically connected to the liquid ejecting end, and the liquid ejecting port is disposed on a side, away from the drive end, of the liquid ejecting end.

In at least one embodiment of the present disclosure, along a length direction of the body, the liquid storage assembly is disposed under the body, and the liquid delivery port is disposed at an end, away from the body, of the liquid storage assembly.

In at least one embodiment of the present disclosure, the liquid storage assembly further includes a clamping groove, the liquid storage assembly is recessed inwardly to form the clamping groove, and the air pump is disposed in the clamping groove, to secure the air pump.

In at least one embodiment of the present disclosure, the phallus-like erotic device capable of ejecting a liquid further includes a fixing member, the fixing member is formed with a fixing cavity, and the body, the air pump, and the liquid storage assembly are disposed in the fixing cavity.

In at least one embodiment of the present disclosure, a fixing cavity is divided into a first part and a second part along a length direction of the body; and

- an end, away from the insertion end, of the body extends into the first part, and the air pump and the liquid storage assembly are disposed in the second part, to prevent an offset between the body and the air pump, and an offset between the body and the liquid storage assembly.

In at least one embodiment of the present disclosure, the phallus-like erotic device capable of ejecting a liquid includes an air pump, and the air pump is disposed in the fixing cavity, electrically connected to the air pump, and configured to control opening, closing, and ejecting of the phallus-like erotic device capable of ejecting a liquid.

In at least one embodiment of the present disclosure, the phallus-like erotic device capable of ejecting a liquid further includes a power supply assembly. The power supply assembly is disposed in the fixing cavity, electrically connected to the air pump, and configured to supply power to the air pump.

Due to the liquid storage assembly and the opening at the insertion end of the phallus-like erotic device capable of ejecting a liquid, the liquid storage assembly controls the liquid to be ejected, which can simulate real experience of liquid ejection, and is closer to the physiological response in real sexual behavior. Liquid ejection provides visual stimulation, and simulates a physiological orgasmic response, improving the interactivity and immersion and providing more personalized and realistic experience.

REFERENCE NUMERALS

100: phallus-like erotic device capable of ejecting a liquid; 10: soft sleeve; 20: main body; 21: opening; 30: liquid storage assembly; 31: air pump; 311: liquid ejecting port; 312: liquid ejecting end; 313: drive end; 32: inner cavity; 321: liquid inlet; 322: liquid delivery port; 33: first connection tube; 34: second connection tube; 35: clamping groove; 40: fixing member; 41: fixing cavity; 411: first part; 412: second part; 50: control assembly; 51: control button; 60: power supply assembly.

DETAILED DESCRIPTION OF THE EMBODIMENTS

Embodiments of the present disclosure are described below with reference to the drawings in the embodiments of the present disclosure. Apparently, the described embodiments are merely some rather than all of embodiments of the present disclosure.

It should be noted that when a component is "connected" to another component, the component may be connected to the another component directly, or indirectly via an intermediate component. When a component is "arranged on" another component, the component may be directly arranged on the another component or there may be an intermediate component. The terms "top", "bottom", "upper", "lower", "left", "right", "front", "rear", and other similar expressions used herein are for illustrative purposes only.

Some embodiments of the present disclosure are described in detail below with reference to the accompanying drawings. If no conflict occurs, the following embodiments and features of the embodiments may be combined with each other.

Figure 1:
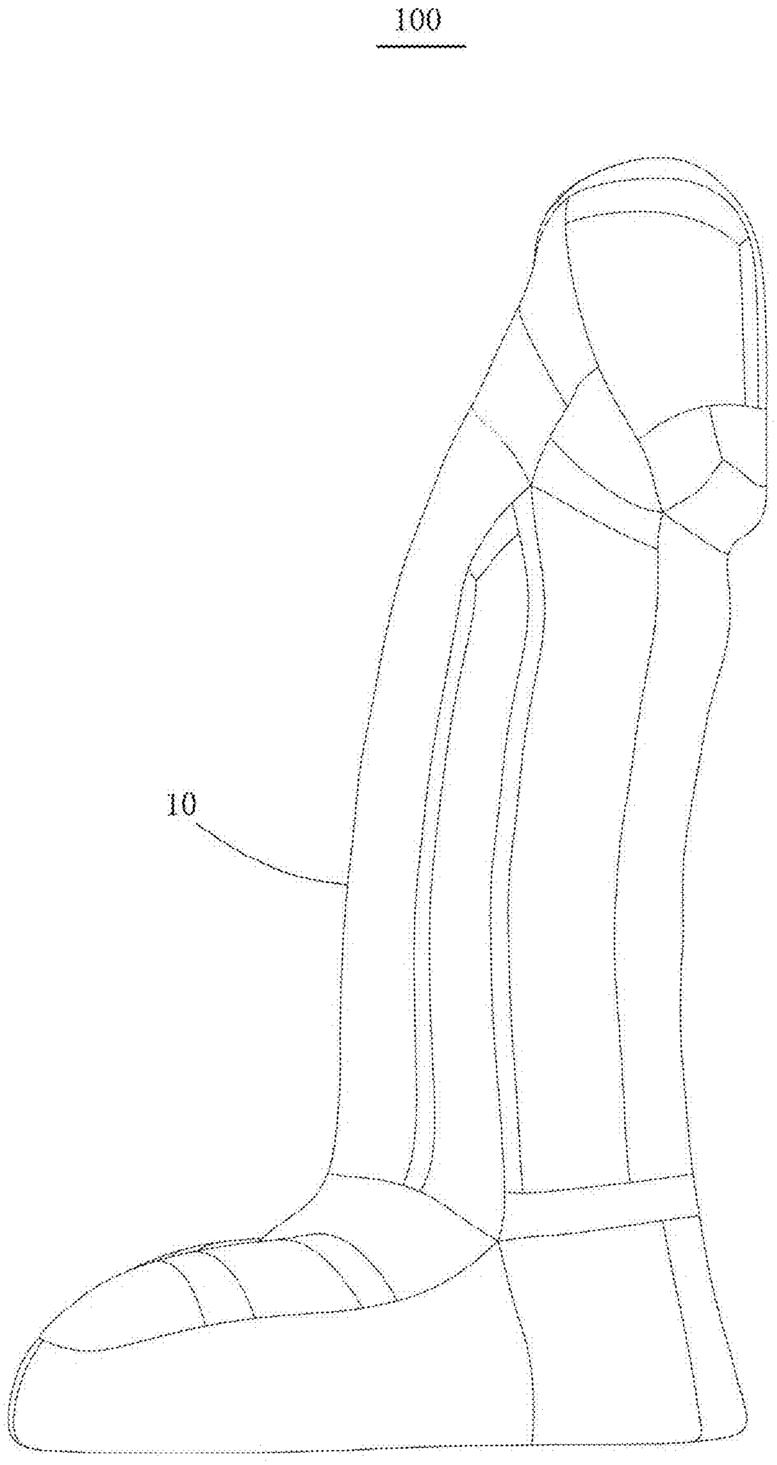
FIG. 1 is a three-dimensional view of a phallus-like erotic device capable of ejecting a liquid according to an embodiment of the present disclosure.
Figure 2:
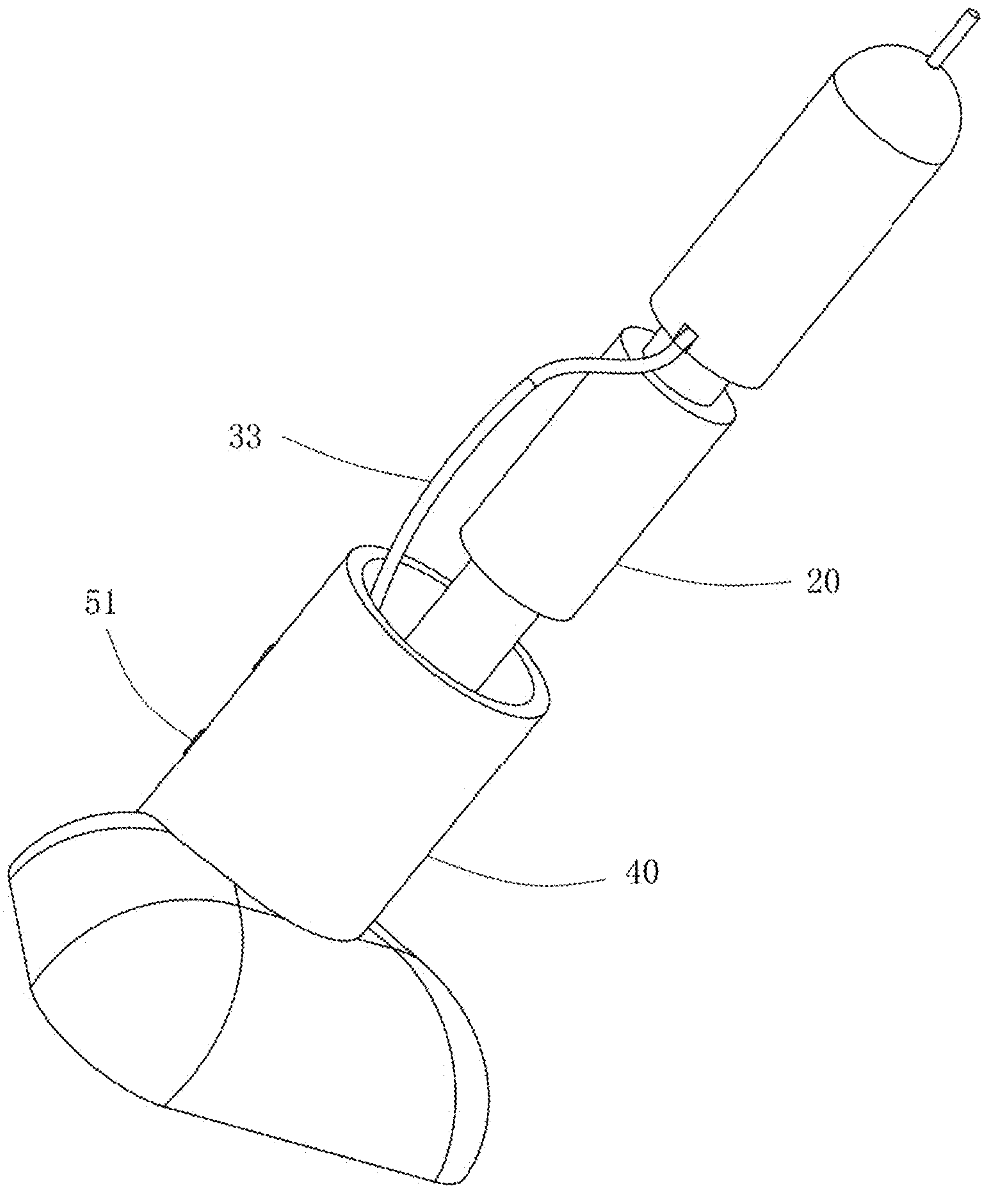
FIG. 2 is a three-dimensional view of an internal structure of a phallus-like erotic device capable of ejecting a liquid in FIG. 1.
Figure 3:
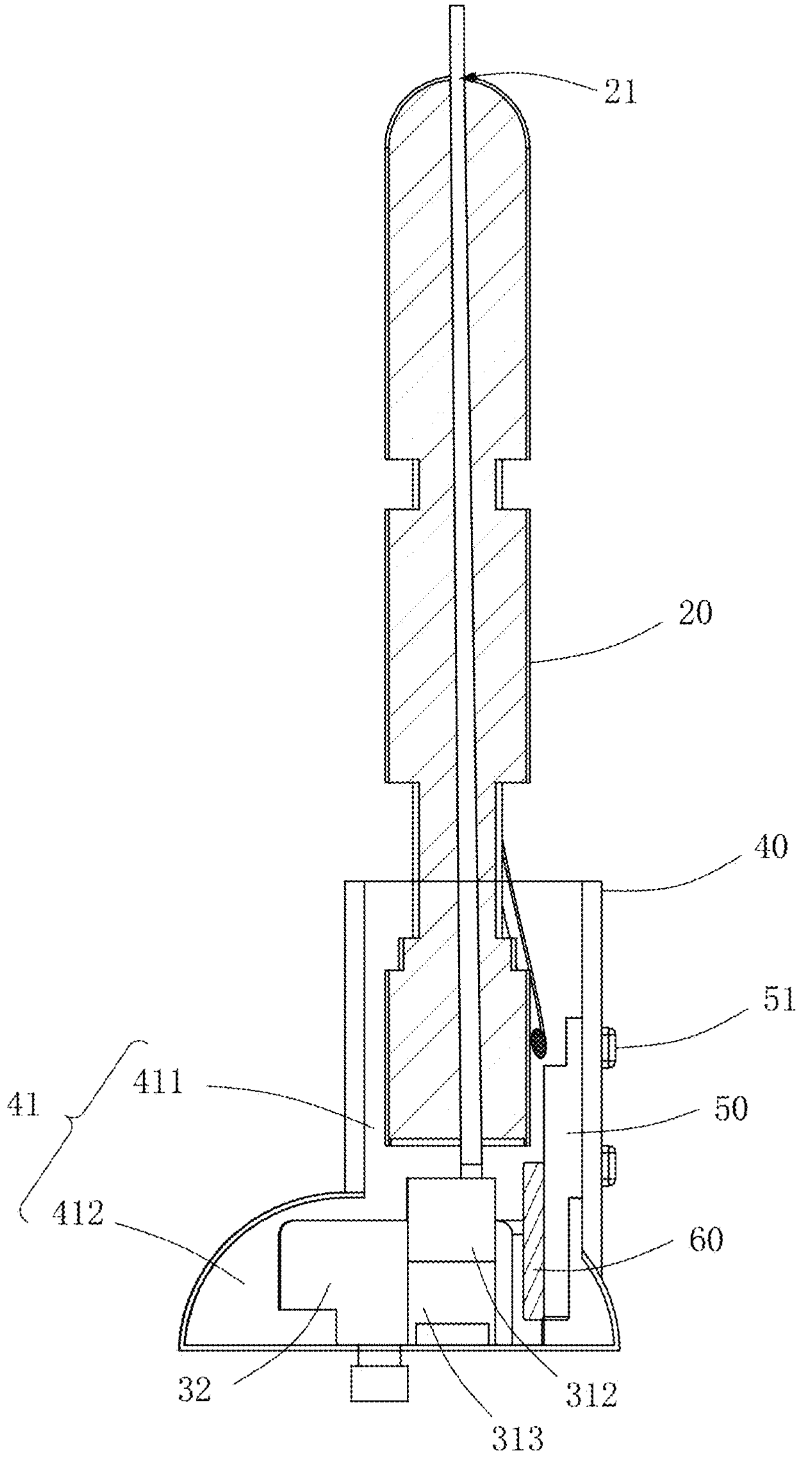
FIG. 3 is a profile of an internal structure of a phallus-like erotic device capable of ejecting a liquid in FIG. 1.
Figure 4:
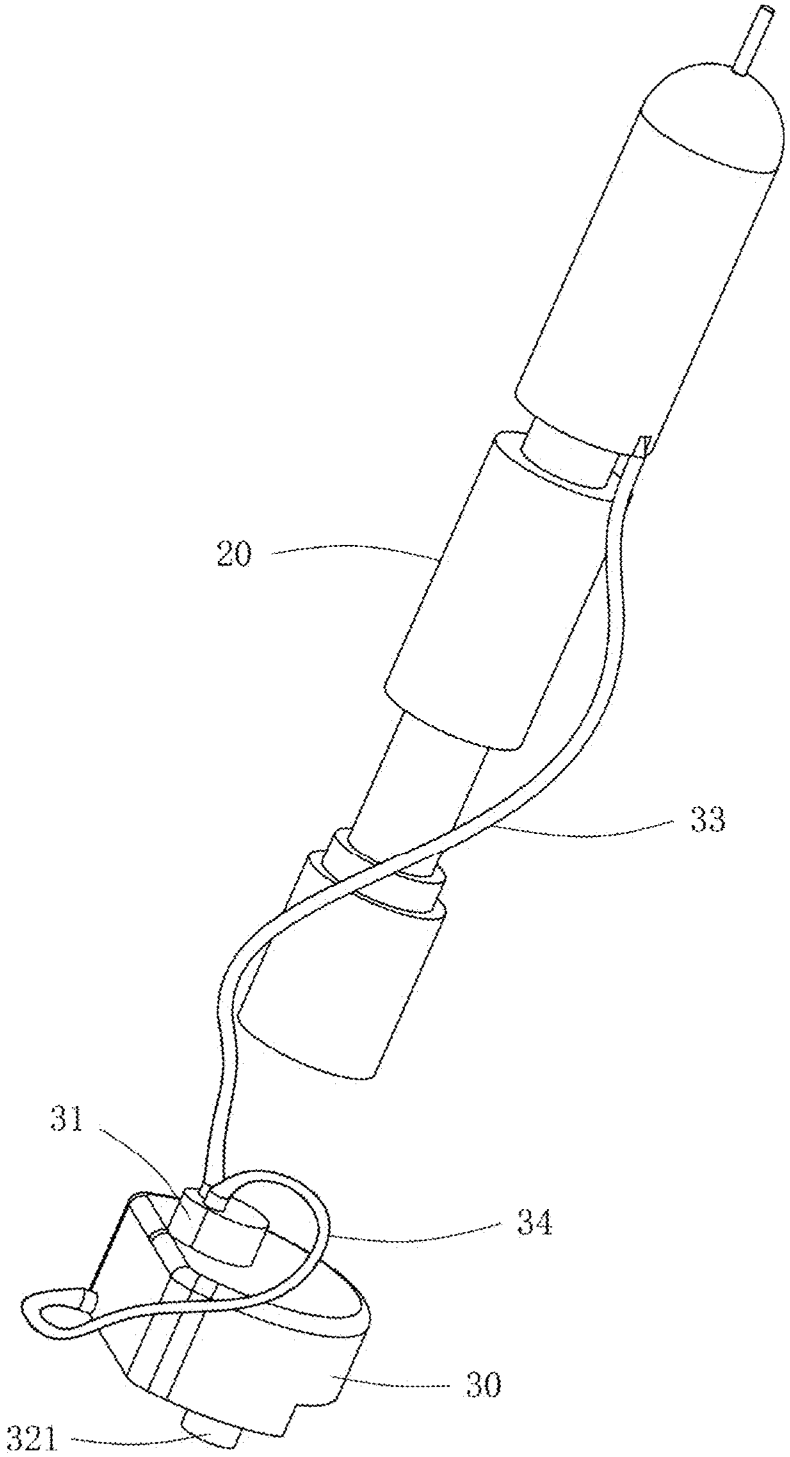
FIG. 4 is a three-dimensional exploded view of an internal structure of a phallus-like erotic device capable of ejecting a liquid in FIG. 1.
Figure 5:
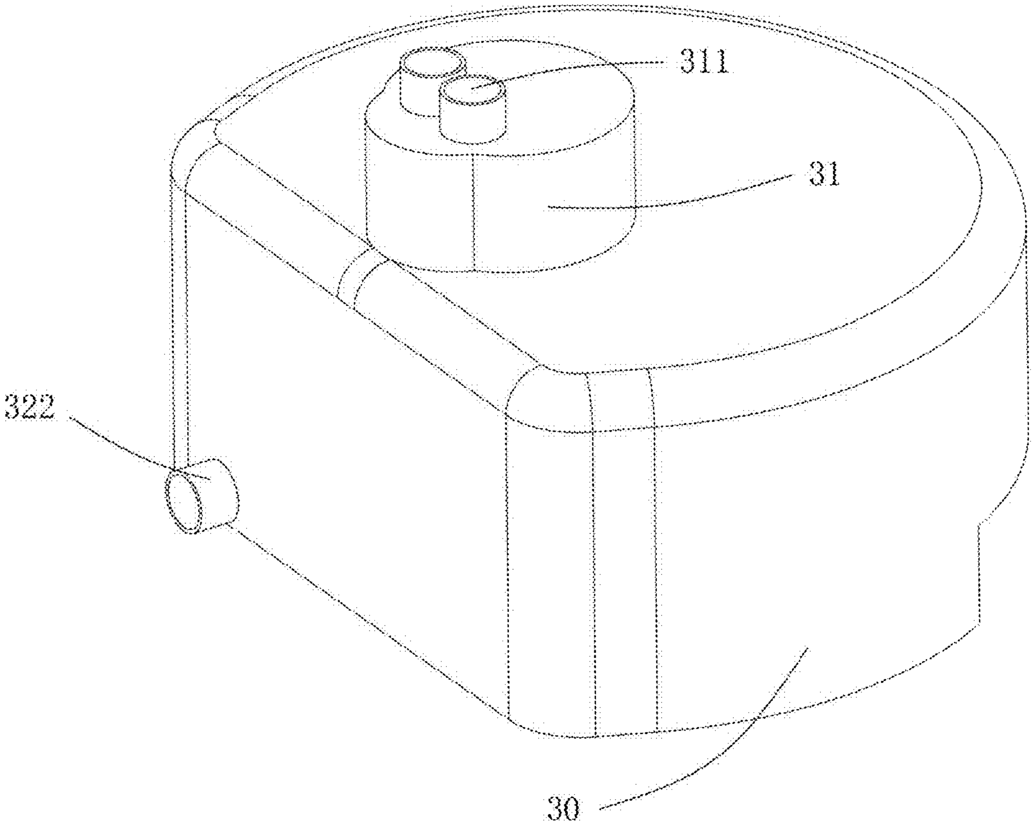
FIG. 5 is a three-dimensional view of a liquid storage assembly of a phallus-like erotic device capable of ejecting a liquid in FIG. 1.
Figure 6:
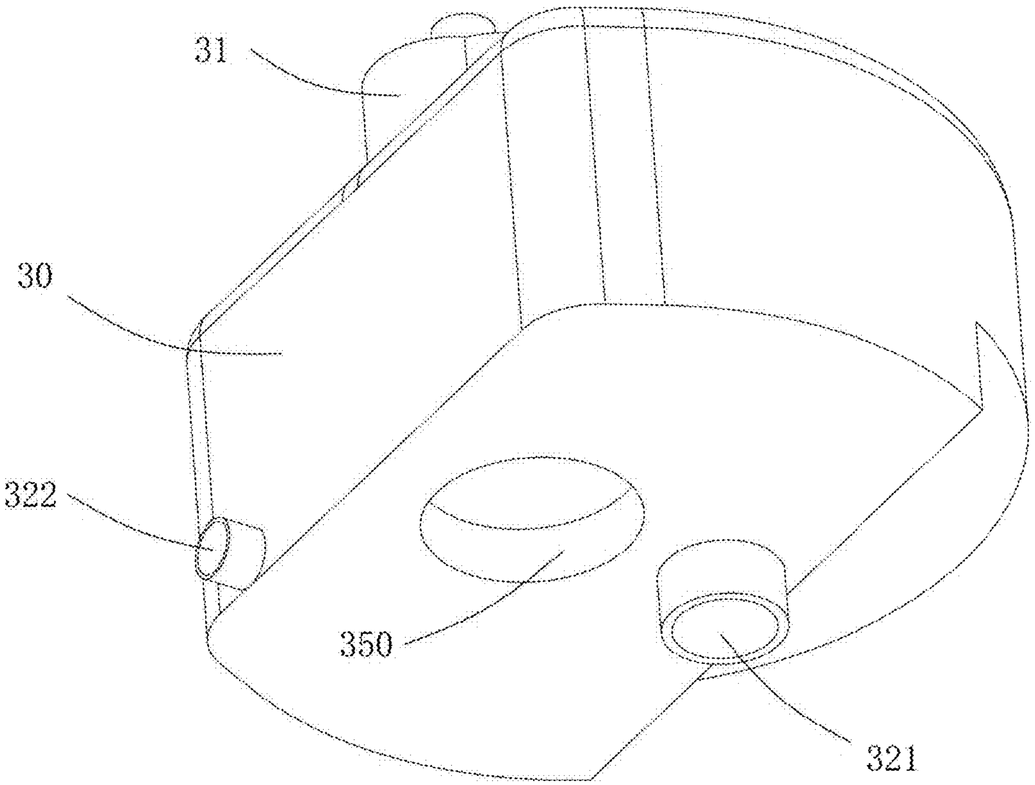
FIG. 6 is a bottom view of a liquid storage assembly of a phallus-like erotic device capable of ejecting a liquid in FIG. 1.

Referring to FIG. 1 to FIG. 6, embodiments of the present disclosure provide a phallus-like erotic device capable of ejecting a liquid 100.

The phallus-like erotic device capable of ejecting a liquid 100 includes: a soft sleeve 10, a body 20, a liquid storage assembly 30, and a control assembly 50.

The body 20 is disposed in the soft sleeve 10, and an opening 21 is formed at an insertion end of the body 20.

The liquid storage assembly 30 is formed with an inner cavity 32. The liquid storage assembly 30 further includes a water tube and an air pump 31. The air pump 31 is disposed in the soft sleeve 10 and connected to the inner cavity 32. One end of the water tube is disposed on the air pump 31, and the other end of the water tube is connected to the opening 21.

The control assembly 50 is disposed in the soft sleeve 10, electrically connected to the air pump 31, and configured to control the liquid to be ejected through the opening 21.

Specifically, the soft sleeve 10 is used for coating the body 20 and providing a soft outer layer, to increase comfort and a sense of reality. The soft sleeve 10 simulates texture of skin, to improve tactile experience of a user. In addition, an internal structure is protected, and service life of the phallus-like erotic device capable of ejecting a liquid is prolonged. The body 20 is a core part of the phallus-like erotic device capable of ejecting a liquid (equivalent to a penis), and disposed in the soft sleeve 10, and the opening 21 formed at the insertion end is used to eject the liquid. The liquid storage assembly 30 stores the liquid, and controls, through the opening 21, the liquid to be ejected. This provides realistic liquid ejecting effect, and enhances physiological simulation experience.

Preferably, the liquid stored in the liquid storage assembly 30 includes, but is not limited to: water, a lubricant, a simulated body fluid, warm liquid, and the like. The water is safe, non-toxic, not easy to cause an allergic reaction, and easily available. The lubricant may enhance comfort and experience, reduce friction, and protect the skin and the phallus-like erotic device capable of ejecting a liquid. The simulated body fluids may simulate a physiological response, provide more realistic experience, and increase interactivity and immersion. The warm liquid may simulate a body temperature, to increase the sense of reality and comfort, and improve experience effect.

Preferably, a telescoping mechanism is disposed in the body 20, to enable the body 20 to telescope in a length direction. The telescoping mechanism includes a plurality of nested telescopic tube segments, a drive motor, and a control assembly 50. The drive motor is mounted in the body 20, and connected to a transmission device of the telescoping mechanism, to drive, via rotation of the drive motor, the telescopic tube segments to move telescopically. The transmission device includes structures such as a gear, a slider, and a guide rail, and is capable of converting a rotational motion of the drive motor into a telescopic motion. The gear meshes racks on the telescopic tube segment, and drives the telescopic tube segment to telescope along the guide rail via rotation.

Further, this telescoping function enables the phallus-like erotic device capable of ejecting a liquid to be closer to real physiological behavior, increasing the sense of reality and satisfaction during use. The user can adjust a telescoping speed and frequency based on the need, to provide diversified use experience and meet different requirements. The telescoping function increases complexity and functionality of the phallus-like erotic device capable of ejecting a liquid, to enable the phallus-like erotic device capable of ejecting a liquid not to be a static simulation device, but an interactive device with dynamic behavior.

In a first specific embodiment, the liquid channel is a hose disposed in the inner cavity 32. The hose surrounds the body 20, and two ends of the hose are respectively connected to the air pump 31 and the opening 21, to enable the air pump 31 to compress and eject the liquid.

In a second specific embodiment, the liquid channel is a liquid channel provided on the body 20. An output end of the air pump 31 is connected to an end of the liquid channel, and the other end of the air pump 31 is connected to the opening 21. The air pump 31 may compress and directly eject the liquid via the liquid channel along the opening 21, to enable a response rate of the phallus-like erotic device to be capable of ejecting a liquid to be higher, and enhance physiological experience.

In a third specific embodiment, the liquid channel may be a liquid channel that is directly provided on the soft sleeve 10. One end of the liquid channel is connected to the liquid ejecting port 311, and the other end of the liquid channel is disposed at a top of an insertion end. The liquid compressed by the air pump 31 enters the liquid channel to implement ejecting effect.

In conclusion, the opening 21 formed at the insertion end of the body 20 is connected to the liquid storage assembly 30 and combined with the telescoping function of the body 20, and the telescoping function simulates physiological behavior of the penis, to enable the phallus-like erotic device capable of ejecting a liquid to be more realistic. The opening 21 is used to eject the liquid, to enhance a realistic physiological response. The liquid storage assembly 30 may precisely control the liquid to be ejected, so that realistic liquid ejecting effect is provided, and the physiological simulation experience is further enhanced.

In a specific embodiment, the phallus-like erotic device capable of ejecting a liquid further includes an air pump 31 and a first connection tube 33 that are disposed on the liquid storage assembly 30.

The air pump 31 is provided with a liquid ejecting port 311, and one end of the first connection tube 33 is connected to the liquid ejecting port 311, and the other end of the first connection tube 33 is connected to the opening 21.

Specifically, the air pump 31 is disposed on the liquid storage assembly 30, and a pressurization function of the air pump 31 ensures that the liquid may be ejected at a specific pressure and speed. This simulates real physiological liquid ejecting effect and improves experience of the user. The liquid ejecting port 311 may control an ejecting direction and an ejecting amount of the liquid, to enable the liquid to be accurately ejected to a specified location through the connection tube and the opening 21 of the body 20, and simulate real physiological injection effect.

In a specific embodiment, the phallus-like erotic device capable of ejecting a liquid further includes a second connection tube 34, and the liquid storage assembly 30 is formed with an inner cavity 32.

The liquid storage assembly 30 includes a liquid inlet 321 and a liquid delivery port 322 that are connected to the inner cavity 32. One end of the second connection tube 34 is connected to the air pump 31, and the other end of the second connection tube 34 is connected to the liquid delivery port 322, to deliver the liquid in the inner cavity 32 to the air pump 31.

Specifically, the second connection tube 34 is responsible for delivering the liquid in the inner cavity 32 of the liquid storage assembly 30 to the air pump 31. This ensures that the liquid may be smoothly delivered to the air pump 31 from the inner cavity 32 of the liquid storage assembly 30, to maintain stability and continuity of supplying of the liquid, and avoid interruption of ejecting due to poor liquid delivery. Further, the liquid delivery port 322 is used to deliver the liquid in the inner cavity 32 of the liquid storage assembly 30 to the air pump 31. This ensures that the liquid in the inner cavity 32 may be smoothly delivered to the air pump 31, to maintain continuity and stability of liquid ejecting. The air pump 31 is used to generate a pressure, to deliver the liquid to the opening 21 from the inner cavity 32 of the liquid storage assembly 30 through the water tube. The water tube is used to deliver the liquid. Because of pressure effect of the air pump 31, the liquid is effectively delivered and ejected, ensuring that the liquid may be ejected as required.

Further, the control assembly 50 is used to start and shut down the air pump 31, to control the liquid to be ejected. This provides a user-friendly control manner, and allows the user to adjust liquid ejecting opportunity and intensity as desired.

In a specific embodiment, the liquid inlet 321 is used to inject the liquid into the inner cavity 32 of the liquid storage assembly 30, and the liquid inlet 321 is sealed via a sealing cap, so that a stand-alone ejecting function is implemented. Therefore, the phallus-like erotic device capable of ejecting a liquid is more portable, and does not need to be connected to an external device.

In another embodiment, the liquid inlet 321 may be directly connected to external liquid, to enable the phallus-like erotic device capable of ejecting a liquid to continuously eject. This meets actual needs of different users and improves experience.

In a specific embodiment, the air pump 31 further includes a liquid ejecting end 312 and a drive end 313 that is electrically connected to the liquid ejecting end 312, and the liquid ejecting port 311 is disposed on a side, away from the drive end 313, of the liquid ejecting end 312.

Specifically, the liquid ejecting end 312 is a part of the air pump 31, and the liquid is ejected through the liquid ejecting port 311. Due to the liquid ejecting end 312, a liquid ejecting direction and force may be centralized, so that precision and strength of ejecting are improved, to enable liquid ejecting to be more realistic. The drive end 313 is a power source of the air pump 31, and power is provided by a motor or other drive device, to enable the air pump 31 to generate sufficient pressure and eject the liquid.

Further, the liquid ejecting port 311 is disposed on a side, away from the drive end 313, of the liquid ejecting end 312, to enable the liquid ejecting port 311 to be away from the drive end 313. Because the liquid ejecting port 311 is away from the drive end 313, impact on the drive end 313 in a liquid ejecting process can be effectively prevented, for example, adverse effect on a motor of the drive end 313 or other drive devices caused by liquid reflux or sputtering. This ensures stability and safety of operation of the phallus-like erotic device capable of ejecting a liquid.

In a specific embodiment, along a length direction of the body 20, the liquid storage assembly 30 is disposed under the body 20, and the liquid delivery port 322 is disposed at an end, away from the body 20, of the liquid storage assembly 30.

Specifically, the liquid storage assembly 30 is disposed below the body 20, for example, arranged in the length direction of the body 20, to enable the liquid storage assembly 30 to be attached to a bottom of the body 20. This arrangement enables a structure of the phallus-like erotic device capable of ejecting a liquid to be more compact, so that an overall volume is reduced, and the user can easily hold and use the phallus-like erotic device capable of ejecting a liquid. In addition, the liquid storage assembly 30 disposed below the body 20 does not interfere with the telescoping function of the body 20, so that comfort of using the phallus-like erotic device capable of ejecting a liquid is improved.

Further, the liquid delivery port 322 is disposed at the end away from the body 20, that is, the bottom of the liquid storage assembly 30, to pump the liquid in the liquid storage assembly 30 to the air pump 31. This ensures that more liquid may be ejected during independent use.

In a specific embodiment, the liquid storage assembly 30 further includes a clamping groove 35. The liquid storage assembly 30 is recessed inwardly to form the clamping groove 35, and the air pump 31 is disposed in the clamping groove 35, to secure the air pump 31.

Specifically, the clamping groove 35 formed when the liquid storage assembly 30 is recessed inwardly clamps the air pump 31, to enable the overall component to be more compact, and enable a connection between the air pump 31 and the liquid storage assembly 30 to be more stable.

Therefore, the liquid in the liquid storage assembly 30 can be more stably delivered to the air pump 31.

In a specific embodiment, the phallus-like erotic device capable of ejecting a liquid further includes a fixing member 40. The fixing member 40 is formed with a fixing cavity 41, and the body 20, the air pump 31, and the liquid storage assembly 30 are disposed in the fixing cavity 41.

Specifically, the fixing member 40 is used to stabilize the body 20, the air pump 31, and the liquid storage assembly 30, to ensure that the body 20, the air pump 31, and the liquid storage assembly 30 do not move or shake during use. The fixing cavity 41 is specific space for accommodating and securing the body 20, the air pump 31, and the liquid storage assembly 30, to ensure that the body 20, the air pump 31, and the liquid storage assembly 30 may effectively work in coordination. The body 20, the air pump 31, and the liquid storage assembly 30 are placed in a predetermined position by the fixing member 40 via the fixing cavity 41. In this way, when the user operates the phallus-like erotic device capable of ejecting a liquid, the body 20, the air pump 31, and the liquid storage assembly 30 can work in coordination at a fixed position, to ensure stability and effectiveness of the phallus-like erotic device capable of ejecting a liquid.

In a specific embodiment, the fixing cavity 41 is divided into a first part 411 and a second part 412 along the length direction of the body 20.

An end, away from the insertion end, of the body 20 extends into the first part 411, and the air pump 31 and the liquid storage assembly 30 are disposed in the second part 412, to prevent an offset between the body 20 and the air pump 31, and an offset between the body 20 and the liquid storage assembly 30.

Specifically, the fixing cavity 41 that is divided into two parts helps to effectively manage and control positions and functions of various components in the phallus-like erotic device capable of ejecting a liquid. The first part 411 is located at an end of the body 20 to ensure stability and a correct position of the first part 411 during use. The second part 412 is dedicated to placing the air pump 31 and the liquid storage assembly 30, to prevent an unnecessary movement or offset between the air pump 31 and the body 20 and between the liquid storage assembly 30 and the body 20. This ensures stability and effectiveness of the phallus-like erotic device capable of ejecting a liquid during operation.

Further, due to the design of the body 20, one end is allowed to be away from the insertion end and extend into the first part 411. This ensures that the body 20 can be stably secured in the first part 411 of the fixing cavity 41 during use, without affecting the telescoping function. This design enables the body 20 to flexibly telescope during use, and to be maintained at a suitable position between the insertion end and an end of the fixing cavity 41.

In a specific embodiment, the phallus-like erotic device capable of ejecting a liquid includes a control assembly 50, the control assembly 50 is disposed in the fixing cavity 41, electrically connected to the air pump 31, and configured to control opening, closing, and ejecting of the phallus-like erotic device capable of ejecting a liquid.

Specifically, the control assembly 50 is electrically connected to the air pump 31, and the user may adjust an on/off state and ejecting intensity of the phallus-like erotic device capable of ejecting a liquid via the control assembly 50. For example, by pressing a button or turning an adjuster, the control assembly 50 sends a signal to the air pump 31, to eject or stop ejecting the liquid.

In a specific embodiment, the control assembly 50 further includes a control button 51. The control button 51 is disposed on the control assembly 50, partially extends outside the fixing member 40, and is used to control an ejecting state of the phallus-like erotic device capable of ejecting a liquid.

Specifically, the control button 51 is an interface for the user to interact with the control assembly 50, and used to receive an input of the user. The user may easily enable various functions of the phallus-like erotic device capable of ejecting a liquid via the control button, such as enabling or disabling ejecting, adjusting the ejecting intensity, and the like. The control button partially extends outside the fixing member 40, to enable the control button to be easily accessible and operated, ensuring protection for other internal components. Due to this extension part, the user can easily find and operate the button, without disassembling the phallus-like erotic device capable of ejecting a liquid or touching inner complex mechanical or electrical parts. This improves convenience for operations of the phallus-like erotic device capable of ejecting a liquid, and increases safety of use.

Further, a main function of the control button is to control the ejecting state, including starting and stopping of ejecting, and adjustment of the ejecting intensity. The user may instantly control a working state of the phallus-like erotic device capable of ejecting a liquid as required, improving practicality and user experience of the phallus-like erotic device capable of ejecting a liquid. For example, ejecting may be started immediately when needed, and stopped quickly when it is not needed, to save liquid and power.

Further, due to the intelligent control function, the phallus-like erotic device capable of ejecting a liquid may be operated automatically and controlled remotely via a preset program or a connection to a smart device. The user may remotely control and monitor the phallus-like erotic device capable of ejecting a liquid by using a mobile application or other smart devices, providing higher flexibility and convenience. For example, the user may set the ejecting mode, intensity, and time on a mobile phone. In a timed ejecting or multiple ejecting mode, use experience and accuracy are improved. The user may implement a complex ejecting mode, improving diversity and effectiveness of use.

In a specific embodiment, the phallus-like erotic device capable of ejecting a liquid further includes a power supply assembly 60. The power supply assembly 60 is disposed in the fixing cavity 41, electrically connected to the control assembly 50, and used to supply power to the air pump 31.

Specifically, the power supply assembly 60 is electrically connected to the control assembly 50, and the control assembly 50 is electrically connected to the air pump 31. When the user needs to enable the liquid ejecting function, the control assembly 50 provides power to the air pump 31 via the power supply assembly 60, to start and maintain the operation of the air pump 31, and drive the liquid to be ejected.

The above described are merely implementations of the present disclosure. It should be noted that the ordinary skilled in the art may make improvements without departing from the concept of the present disclosure, but such improvements should fall within the protection scope of the present disclosure.

What is claimed is:

1. A phallus-like erotic device capable of ejecting a liquid, comprising:

a sleeve;

a body, disposed in the sleeve, wherein an opening is formed at an insertion end of the body;

a liquid storage assembly, formed with an inner cavity, wherein the liquid storage assembly further comprises an air pump, the air pump is disposed in the sleeve and connected to the inner cavity;

a liquid channel, having one end disposed on the air pump and another end disposed on the opening;

the liquid storage assembly is further formed with a liquid inlet connected to the inner cavity, and the liquid inlet is configured to allow liquid to be injected into the inner cavity; and a control assembly, disposed in the sleeve, electrically connected to the air pump, and configured to control the liquid to be ejected through the opening.

2. The phallus-like erotic device capable of ejecting a liquid according to claim 1, wherein the air pump is provided with a liquid ejecting port, and the liquid channel is a tube for delivering the liquid, wherein the tube comprises a first connection tube and a second connection tube; and one end of the first connection tube is connected to the liquid ejecting port, the other end of the first connection tube is connected to the opening, one end of the second connection tube is connected to the air pump, and the other end of the second connection tube is connected to the inner cavity.

3. The phallus-like erotic device capable of ejecting a liquid according to claim 2, wherein the liquid storage assembly comprises a liquid delivery port connected to the inner cavity, the one end of the second connection tube is connected to the air pump, and the other end of the second connection tube is connected to the liquid delivery port.

4. The phallus-like erotic device capable of ejecting a liquid according to claim 3, wherein along a length direction of the body, the liquid storage assembly is disposed under the body, and the liquid delivery port is disposed at an end, away from the body, of the liquid storage assembly.

5. The phallus-like erotic device capable of ejecting a liquid according to claim 4, wherein the phallus-like erotic device capable of ejecting the liquid further comprises a fixing member, the fixing member is formed with a fixing cavity, and the body, the air pump, and the liquid storage assembly are disposed in the fixing cavity.

6. The phallus-like erotic device capable of ejecting a liquid according to claim 5, wherein the control assembly further comprises a control button, and the control button is disposed on the control assembly, partially extends outside the fixing member, and is configured to control an ejecting state of the phallus-like erotic device capable of ejecting the liquid.

7. The phallus-like erotic device capable of ejecting a liquid according to claim 5, further comprising a power supply assembly, wherein the power supply assembly is disposed in the fixing cavity, electrically connected to the control assembly, and configured to supply power to the air pump.

8. The phallus-like erotic device capable of ejecting a liquid according to claim 2, wherein the air pump further comprises a liquid ejecting end and a drive end that is electrically connected to the liquid ejecting end, and the liquid ejecting port is disposed on a side, away from the drive end, of the liquid ejecting end.

9. The phallus-like erotic device capable of ejecting a liquid according to claim 1, wherein the liquid storage assembly further comprises a clamping groove, the liquid storage assembly is recessed inwardly to form the clamping groove, and the air pump is disposed in the clamping groove, to secure the air pump.

10. The phallus-like erotic device capable of ejecting a liquid according to claim 9, wherein a fixing cavity is divided into a first part and a second part along a length direction of the body; and an end, away from the insertion end, of the body extends into the first part, and the air pump and the liquid storage assembly are disposed in the second part, to prevent an offset between the body and the air pump, and an offset between the body and the liquid storage assembly.

* * * * *